United States Patent
Lonergan

(10) Patent No.: US 7,175,865 B2
(45) Date of Patent: *Feb. 13, 2007

(54) METHOD OF PRODUCING FROZEN DOUGH, AND RELATED PRODUCTS

(75) Inventor: Dennis A. Lonergan, Medina, MN (US)

(73) Assignee: General Mills Marketing, Inc., Minneapolis, MN (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/127,485

(22) Filed: May 12, 2005

(65) Prior Publication Data

US 2005/0266119 A1    Dec. 1, 2005

Related U.S. Application Data

(60) Provisional application No. 60/570,380, filed on May 12, 2004.

(51) Int. Cl.
*A21D 2/00* (2006.01)

(52) U.S. Cl. .......................... 426/19; 426/27; 426/549; 426/656

(58) Field of Classification Search .................. 426/19, 426/27, 549, 656
See application file for complete search history.

(56) References Cited

U.S. PATENT DOCUMENTS

| | | | |
|---|---|---|---|
| 3,894,155 A | 7/1975 | Ono et al. | |
| 4,450,177 A | 5/1984 | Larson et al. | |
| 4,600,587 A | 7/1986 | Nomura et al. | |
| 4,966,778 A | 10/1990 | Benjamin et al. | |
| 5,260,076 A | 11/1993 | Furcsik et al. | |
| 5,352,606 A | 10/1994 | Takano et al. | |
| 5,589,207 A | 12/1996 | Larsen et al. | |
| 5,672,369 A | 9/1997 | Lonergan et al. | |
| 5,804,233 A | 9/1998 | Lonergan et al. | |
| 6,372,481 B1 | 4/2002 | Wada et al. | |
| 6,884,443 B2 * | 4/2005 | Domingues et al. | 426/19 |

FOREIGN PATENT DOCUMENTS

| WO | WO 94/03617 | 2/1994 |
|---|---|---|
| WO | WO 98/10657 | 3/1998 |
| WO | WO 01/32023 | 5/2001 |
| WO | WO 01/64039 | 9/2001 |
| WO | WO 01/78514 | 10/2001 |

OTHER PUBLICATIONS

Stear, C. Handbook of Breadmaking Technology, 1990, Elsevier Science Publishers, LTD. p. 689-707.*

Casey, G.P. and Foy, J.J., "Yeast Performance in Frozen Doughs and Strategies for Improvement," Frozen & Refrigerated Doughs and Batters, American Association of Cereal Chemists, Inc., Chapter 2, 1995.

* cited by examiner

*Primary Examiner*—Keith Hendricks
*Assistant Examiner*—Jyoti Chawla
(74) *Attorney, Agent, or Firm*—Arlene L. Hornilla; Everett G. Diederik; Daniel Schulte

(57) ABSTRACT

Described are methods for preparing frozen dough compositions that exhibit desirable frozen storage stability and that can also exhibit desirable baked organoleptic (e.g., taste, smell, and texture) properties, as well as related methods.

14 Claims, 2 Drawing Sheets

METHOD OF PRODUCING FROZEN DOUGH, AND RELATED PRODUCTS

REFERENCE TO RELATED APPLICATIONS

This application claims the benefit of priority under 35 U.S.C. 119(e)(1) of a provisional patent application, Ser. No. 60/570,380, filed May 12, 2004, which is incorporated herein by reference in its entirety.

FIELD OF THE INVENTION

The invention relates to dough compositions, including unproofed "fermented" or "yeast-fermented dough compositions," that contain fermented yeast, including unproofed dough compositions that are or can be frozen, stored, thawed, then proofed and cooked, as well as related packaged dough products and related methods.

BACKGROUND OF THE INVENTION

For centuries, leavened baked dough products have been prepared using yeast as a leavening agent. Dough ingredients such as flour, water, and optionally fat (e.g., oil), flavorants (e.g., salt or sweeteners), etc., are combined with yeast to form a dough mass. The dough is allowed to set for a time, typically at ambient temperature, to allow the yeast to produce carbon dioxide. During this step, known as "proofing," carbon dioxide bubbles expand and leaven the dough to produce a lighter ("leavened") raw and baked dough product. In addition to carbon dioxide and a leavened dough, the fermenting yeast also produces the pleasant aroma, flavor, and texture of a baked dough product that are often associated with freshly-baked bread that has been leavened by fermentation of yeast. Thus, yeast-fermenting a dough composition has been used for centuries to provide expected taste and aroma of a freshly-baked dough product.

In the past, preparing and baking the dough would not involve a freezing step. In modern times, though, bakeries and individual consumers greatly enjoy frozen doughs because of the convenience of allowing frozen doughs to be prepared, stored while frozen, and then thawed and cooked (e.g., baked) at a convenient time.

Frozen doughs should desirably produce a cooked dough product having properties comparable to cooked dough products that have been prepared and cooked without having been frozen. In practice, however, it is a substantial challenge to produce doughs that can be frozen for an extended period (e.g., in excess of 1 to 2 weeks for doughs that have been fermented prior to freezing, and from 3 to 6 months for doughs that have not been fermented prior to freezing) and then cooked to properties identical to doughs that are not stored frozen. This is especially true of doughs that are processed to allow yeast to ferment prior to freezing.

Yeast-leavened doughs that have been frozen for an amount of time may exhibit diminished stability (shelf life) in that leavening properties and baking quality of the dough may deteriorate after a few weeks of frozen storage. Deteriorated leavening properties and baking quality can mean extended proof times, deficient dough texture, or the inability to proof at all, any of which may result from a combination of yeast-related issues and physical damage to the structure of the gluten network of the dough.

Factors that can relate to shelf life of a frozen, unproofed dough product can include yeast viability and maintenance of yeast activity through frozen storage. An unproofed dough product, following frozen storage and upon thawing, must contain yeast that is sufficiently viable and intact to metabolize and generate carbon dioxide to leaven a dough during proofing. Yeast cells, being living organisms, may be susceptible to damage during freezing and frozen storage. Damaged yeast cells may lose their ability to produce carbon dioxide and to leaven (proof) a dough composition. In particular, it has been observed that yeast can become damaged if a yeast cell has become active during processing prior to freezing, meaning that the yeast has worked to metabolize ingredients of the dough to produce carbon dioxide, i.e., has fermented the dough. Still, fermentation prior to freezing is desired to achieve expected organoleptic properties of flavor, aroma, and texture. Consequently, there exists an ongoing need to achieve desired organoleptic qualities in a frozen unproofed dough, using fermentation of yeast prior to freezing, in a way that also achieves extended frozen shelf life with good proofing qualities of a dough upon thawing.

SUMMARY OF THE INVENTION

The invention relates to yeast-fermented doughs prepared to include dry yeast, that can exhibit desired organoleptic properties (one or more of desired flavor, aroma, and texture properties), and that also exhibit desirable frozen shelf life when stored in an unproofed condition. Desired organoleptic properties are important for consumer acceptance of a frozen dough product. Extended shelf life is always desirable for consumer acceptance and commercial success.

Desired organoleptic properties can be achieved by allowing yeast in a dough to be active and ferment within the dough, before freezing the dough. For example, many commercial bread doughs include as a step during their manufacturing process of up to 24 hours of fermentation, e.g., 3 hours for some white bread dough products. One disadvantage, however, of allowing yeast to become active prior to freezing, can be that the activated yeast can be more susceptible to damage during frozen storage, which can reduce shelf life of a resultant dough product by reducing the level of metabolic activity that the yeast can achieve upon thawing, which reduces the ability of the yeast to become active to proof and leaven a dough after frozen storage. The more active a yeast becomes before freezing, the more susceptible the yeast can become to such adverse effects. Thus, it has previously been taught that limiting yeast activity before freezing can improve performance of yeast in a frozen, unproofed dough, by improving the ability of the yeast to proof the dough upon thawing. Yet there remains the opposing motivation to activate yeast prior to freezing, to produce desired organoleptic properties.

According to the invention, an amount of yeast (referred to sometimes herein as "early stage" yeast) is combined with other dough ingredients and allowed to ferment and contribute desired flavor, aroma, or texture, to a dough composition. A portion, e.g., a substantial amount of, the early stage yeast is "hydrated" as is it added, or becomes hydrated during processing. This yeast becomes active and ferments within the dough composition to produce a yeast-fermented dough composition with desired organoleptic properties.

An additional portion of yeast (referred to sometimes herein as "later stage" or "late stage" yeast), in the form of a dry yeast ingredient, is also added to the dough or dough ingredients. The late stage, dry yeast, is added to a dough composition at a time that prevents at least a portion of the dry yeast from becoming hydrated prior to freezing; i.e., at least a portion of the late stage dry yeast is non-hydrated at the time of freezing the dough composition. As a result, a dough of the invention includes some amount of non-hydrated yeast at freezing. This yeast, because it has not become hydrated, has not been weakened to become susceptible to damage during freezing, as happens when yeast cells become hydrated and active. This non-hydrated yeast can contribute to desired proofing of the unproofed dough composition upon thawing and prior to baking.

As used herein, the terms "hydrated" and "non-hydrated," in relation to a yeast ingredient or yeast cells, are used in a manner consistent with the meanings associated with these terms in the yeast and dough making arts. A non-hydrated yeast, for instance, includes yeast in the form of-dry yeast ingredient, as known in the dough and bread-making arts (e.g., a yeast ingredient having a moisture content of less than 10 percent by weight). A non-hydrated yeast also includes a dry yeast ingredient that has been added to a dough composition and not allowed to hydrate.

Some dry yeast ingredients are in the form of a dry powdery substance that contains identifiable "granules" of agglomerated dry yeast cells, each granule being made up of a collection of thousands of dry yeast cells. Examples of such granules may have a diameter on the scale of 100 microns or larger. To become hydrated, the individual yeast cells must absorb water, which can occur by yeast cells becoming separated from the granules and dispersed into a dough composition, e.g., by mixing the dough ingredients in a way that distributes individual yeast cells away from the granule and throughout a dough composition. Alternatively, yeast cells can become hydrated if a yeast granule, even if not broken down to individual cells by mixing, absorbs sufficient water over time to hydrate the individual cells of the granule. Non-hydrated yeast in a dough composition can be in the form of dry yeast ingredient that contains granules of yeast cells, wherein the individual yeast cells of the granules have not become fully dispersed in a dough composition but remain at least in part in recognizable granule form, and wherein the granules have not absorbed water such that a substantial amount of the yeast cells (e.g., at least 50 percent or more) of the granules have become hydrated and active.

Yeast cells and yeast granules can be viewed by microscopic analysis of a dough composition to review whether a yeast ingredient or yeast cells are dispersed or in the form of granules. Granules of yeast cells that can be viewed in a dough composition, wherein the granules have not absorbed water to hydrate the cells of the granules, include non-hydrated yeast cells. Yeast cells that can be viewed in a dough composition as granules of agglomerated yeast cells, wherein the granules have been exposed to water for a time that allows the yeast cells of the granules to absorb water to become hydrated (e.g., at least an hour), include hydrated yeast cells. Yeast cells that can be viewed in a dough composition in a non-granule form (e.g., dislocated from granules by high speed mixing to distribute individual yeast cells throughout a dough composition) normally become hydrated within a short time upon exposure to the dough composition, e.g., within a short time from becoming separated from a yeast ingredient granule.

According to the invention, adding dry yeast to a dough composition during preparation, and preventing an amount of that dry yeast from becoming hydrated before the dough composition is frozen, prevents damage to yeast cells that might occur during freezing or frozen storage. Thus, in accordance with the present description and the discussion of non-hydrated and hydrated yeast ingredients and yeast cells, methods of the invention can involve adding dry yeast to a dough composition—e.g., in the form of a yeast ingredient that includes granules of dry yeast cells—during preparation of a dough. The dry yeast can be added at a late stage of preparation, and the dough composition can be frozen before the yeast has enough time to become hydrated, and without exposing the yeast to conditions such as an amount of mixing that would cause the granules of yeast cells to break down and allow individual yeast cells to become dispersed and hydrated. Some amount of the individual cells of a late stage dry yeast may necessarily become hydrated. Still, enough of the individual cells remain non-hydrated to affect proofing properties of the dough composition after freezing, compared to a similar fermented unproofed dough that does not include late stage-added dry yeast.

An unproofed, yeast-fermented dough according to the invention can be prepared by methods that include standard steps or techniques such as those referred to as sponge, straight-dough, or continuous dough making methods, as well as any of these or other methods that also involve re-work or re-cycled dough. The presence of an amount of fermented yeast in a dough can be accomplished, for example, by any effective method, such as by a resting or fermenting step associated with a sponge dough method; by the use of a pre-ferment, rest, or retarding step in a non-sponge dough (i.e., a "straight dough") composition; or by any method that involves the use of re-worked or re-cycled dough (e.g., by combining fermented "rework" dough with other dough ingredients or another dough composition).

One possible effect found to occur according to certain specific embodiments of methods and compositions of the invention can include useful and advantageous frozen stability and shelf life of a frozen, unproofed, yeast-fermented dough product, including useful proofing properties following extended periods of frozen storage. According to certain embodiments of the invention, an unproofed frozen dough composition can be stored for greater than 2 weeks, greater than 4 weeks, greater than 6 weeks, and even up to or exceeding 10, 20, 30, or 36 weeks at frozen storage (e.g.,—18 degrees Celsius), and can still exhibit useful proofing properties, e.g., the ability to be proofed to double its original volume (after thawing) within a reasonable time following thawing, at a proofing temperature of about 30 degrees Celsius.

As used herein, the term "frozen" as applied to dough products refers to a dough product maintained at a temperature below the freezing point of water, regardless of whether all ingredients in the dough product are actually in a frozen state. As an example, a frozen dough product can be maintained at a temperature in the range from 0 degrees Fahrenheit to negative 10 degrees Fahrenheit, e.g., may have an internal temperature that is equal to or less than about 10° F.

In the present description, all percentages are in terms of the total weight of a finished dough composition except where otherwise specifically indicated, such as in the specific instance of referencing a dough sponge. Thus, weight percentages are normally in weight percent of a total dough composition including flour.

In one aspect, the invention relates to a method for producing an unproofed frozen dough. The method includes: preparing a yeast-containing dough that includes an early stage portion of yeast, allowing at least some of yeast of the early stage portion of yeast to ferment to form a yeast-fermented dough composition, adding dry yeast to the yeast-fermented dough composition, and freezing the yeast-fermented dough composition without proofing and while some of the added dry yeast is non-hydrated.

In another aspect, the invention relates to a method for producing a frozen, unproofed dough composition. The method includes: preparing a yeast-containing dough that contains an early stage portion of yeast, allowing at least some of yeast of the early stage portion of yeast to ferment to form a yeast-fermented dough composition, adding dry yeast to the yeast-fermented dough composition, and freezing the yeast-fermented dough composition without proofing.

In another aspect, the invention relates to a frozen, unproofed, yeast-fermented dough composition. The dough contains flour, water, from 0.5 to 5 weight percent hydrated yeast ingredient, and from 0.5 to 5 weight percent non-hydrated, dry yeast ingredient, based on the total weight of the frozen dough.

DETAILED DESCRIPTION

Figure 1:
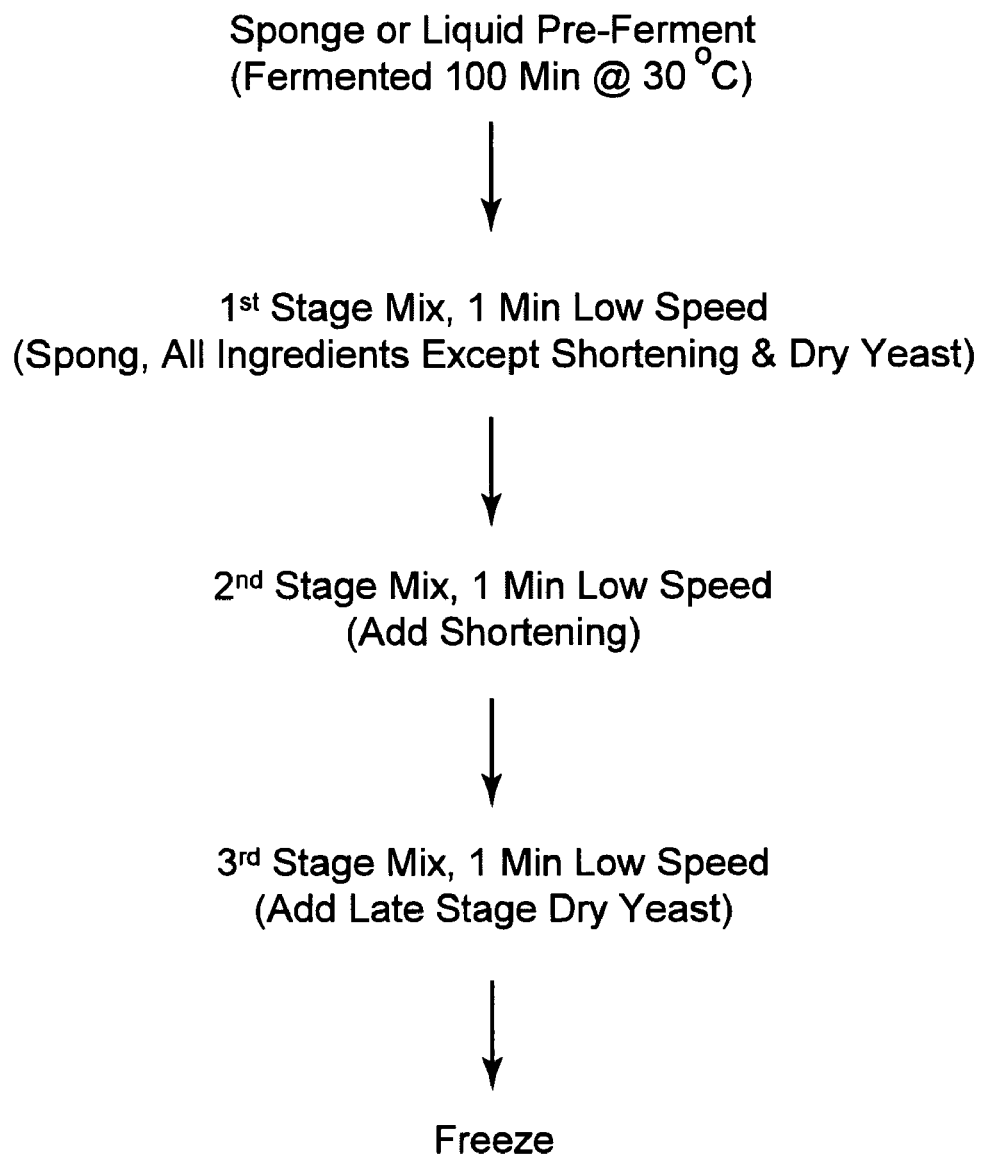
FIG. 1 is a flow chart that illustrates some exemplary steps of processes according to the invention, including mixing steps and a step of adding dry yeast.

According to the invention, a yeast-fermented dough composition is prepared. A "yeast-fermented dough composition" (or "yeast-fermented dough") refers to a dough composition that contains yeast and one or more other dough ingredients (e.g., at least yeast, water, and flour, or a fermentable carbohydrate), and that has been exposed to conditions that allow the yeast to ferment to produce an amount of carbon dioxide and other metabolites that will have at least some leavening effect on the dough, and that results in desired organoleptic properties such as taste, aroma, and texture, upon thawing, proofing, and cooking (normally, but not necessarily, baking) the dough. A yeast-fermented dough is not "proofed" as is a "pre-proofed" frozen dough, but is processed to allow yeast to produce carbon dioxide to an extent typical of a fermented, non-pre-proofed or unproofed dough that can be further processed, frozen, thawed, then proofed and baked to a baked specific volume that can be typical of other cooked (e.g., baked), non-pre-proofed, yeast-fermented, dough products.

Methods useful for preparing a yeast-fermented dough within the context of the present description can include various known or conventional steps or techniques that can be useful to produce a yeast-fermented dough composition. These include techniques associated with methods referred to as sponge methods, straight-dough methods, continuous methods, and methods that involve re-worked or recycled dough. For example, according to certain embodiments of the invention, a yeast-fermented dough composition may be provided by one or more of: fermenting a yeast-containing dough sponge (i.e., by a sponge method); partially (e.g., nearly fully) processing and optionally cutting or assembling a fermented or non-fermented dough composition to a dough product (without freezing) and then removing non-used portions of the dough (re-work dough), which may be fermented before or after such removal (i.e., by a re-work method); or by preparing and allowing to ferment, a non-sponge (straight dough) yeast-containing dough composition, at room temperature or at refrigerated temperature (e.g., in a retarder) (i.e., a straight-dough method). Any of these steps (as well as others) can result in a yeast-containing dough that has experienced processing conditions sufficient to allow the yeast to ferment, resulting in a yeast-fermented dough composition.

Generally, dough compositions according to the invention can be prepared from ingredients known in the dough and bread-making arts, typically including flour, yeast, a liquid component such as oil or water, and optionally additional ingredients such as shortening, salt, sweeteners, dairy products, egg products, processing aids, emulsifiers, particulates, dough conditioners, flavorants, etc.

Yeast included in a yeast-fermented dough composition can be in the form of a yeast ingredient that contains yeast that can ferment to achieve desired organoleptic properties as well as desired raw specific volumes and baked specific volumes. Generally useful yeast ingredients for preparing a yeast-fermented dough composition can include types of yeast ingredients sometimes referred to as fresh crumbled yeast (also called cake yeast or compressed yeast); yeast cream; a dry yeast such as instant dry yeast, dry active yeast, protected active dry yeast; frozen yeast; and combinations of these.

Yeast ingredients such as these can differ in the amount of moisture they contain, which can in turn influence how much of a particular yeast ingredient should be combined with other ingredients to provide a dough composition according to the invention. For example, some yeast ingredients have a high moisture content (e.g., greater than 60% by weight). These high moisture yeast ingredients include those yeast ingredients sometimes referred to as fresh crumbled yeast, cake yeast, compressed yeast, and yeast cream.

Other yeast ingredients can include lower amounts of moisture, e.g., less than 10 percent by weight, and include yeast ingredients sometimes designated "dry" yeast ingredients. Dry yeast ingredients are known in the dough and bread making arts, and typically are yeasts that have been processed to remove some (but not necessarily all) moisture, in a manner that allows the yeast to become re-hydrated and active upon re-hydration. A dry yeast ingredient can typically include a relatively low amount of moisture, e.g., below 10 percent by weight, e.g., from 2 to 8 percent by weight. Examples of dry yeast ingredients include yeast ingredients referred to as active dry yeast and instant dry yeast.

The moisture content of a yeast ingredient can affect the total amount of a yeast ingredient included in a dough composition. Fresh crumbled yeast, cake yeast, and compressed yeast can typically have a moisture content of about 70 percent moisture per total weight of the yeast ingredient. Yeast creams typically have a higher moisture content, and dry yeast ingredients such as dry active yeasts typically have a lower moisture content, e.g., typically about 7 or 8 percent moisture per total weight of the yeast ingredient. Thus, due to differences in moisture content, different amounts of a dry yeast ingredient (including water in a lower amount) would be needed compared to higher moisture content yeast ingredient such as fresh crumbled yeast, cake yeast, or compressed yeast. (The term "yeast ingredient," e.g., when used to describe amounts of yeast in a dough composition, is used herein to refer to yeast in a form that includes the moisture content of the yeast ingredient.)

According to the invention, yeast can be combined with other ingredients to prepare a dough composition that can be fermented to a yeast-fermented dough. The type and amount of this yeast can be sufficient to allow processing of the dough to form a yeast-fermented dough. Yeast included with dough ingredients or in a dough composition or precursor (e.g., in a sponge, pre-ferment dough portion, or in a early (e.g., first) stage mix) early enough during processing to ferment to produce a yeast-fermented dough composition, can be referred to herein as "early stage yeast" or an "early stage yeast portion"; this yeast is in contrast to yeast added at a later time during processing, at least a portion of which is to remain non-hydrated prior to freezing to preserve the ability of late stage yeast to activate after freezing.

An early stage yeast portion can be of any useful type of yeast or yeast ingredient, and can be used in an amount to combine with other dough ingredients to allow at least some of the early portion yeast cells to ferment to produce desired organoleptic properties in a cooked (e.g., baked) dough product; to achieve a desired raw specific volume prior to freezing; and also possibly but not necessarily to contribute to some degree in proofing the dough after frozen storage and thawing, prior to baking. The yeast can be added to the dough composition by any useful method, such as by adding a yeast ingredient to other dough ingredients such as one or more of flour, water, yeast food, etc., in any useful order or combination, and combined (e.g., mixed) to produce a raw dough composition for fermentation. The yeast can be added at a time relative to other processing steps (e.g., relative to a subsequent freezing step) to result in some amount of fermentation activity of the yeast within the dough or mixture of dough ingredients, to produce a desired raw specific volume of the dough prior to freezing, and also to provide desired organoleptic properties upon baking the dough.

The early stage yeast portion may be added dry (non-hydrated) or hydrated (e.g., a high moisture yeast ingredient). If dry, the early stage yeast can become hydrated upon contact with water (separate from other dough ingredients) or with dough ingredients that include water. Alternatively, when an early stage yeast portion includes a high moisture yeast ingredient, yeast cells can be substantially completely hydrated when added to other dough ingredients to form a sponge, pre-ferment dough composition, or when added to other dough ingredients to prepare any other form of dough composition. The early stage yeast, when contacted with a suitable yeast food or substrate, can begin to ferment and continue to ferment until becoming de-activated, e.g., by freezing.

Amounts of yeast ingredients used as an early stage yeast portion to produce a yeast-fermented dough composition can be selected based on various factors such as the type of yeast ingredient used (e.g., high or low moisture); the amount of fermentation or leavening desired prior to freezing (e.g., in terms of organoleptic properties or raw specific volume); the timing of a fermentation step, e.g., from 30 minutes to 3 hours to 12 hours or more; the amount, type, and timing of processing that the dough will undergo after addition of the early stage yeast portion, such as whether the early stage yeast portion is added to produce a fermented sponge, rework dough, or another type of fermented dough composition, and the time between addition of the early stage yeast portion and freezing of a resultant dough composition; etc.

An exemplary amount of compressed yeast can be an amount in the range from 0.5 to 5 weight percent, e.g., from 1 to 3 weight percent, based on a total weight of a complete dough composition. Other yeast ingredients that have similar moisture content can be used in these same ranges. Yeast ingredients that have different (higher or lower) percent moisture can be used as an early stage yeast portion in higher or lower amounts (respectively), but still in amounts that will provide the same or similar amount of the yeast component (yeast cells) of the yeast ingredient.

Dough, sponge, and frozen dough compositions of the invention can in general be prepared from standard dough ingredients including yeast—such as an early stage yeast portion discussed above—water, flour, and other ingredients, in amounts useful to prepare a dough composition for freezing, thawing, proofing, and cooking (e.g., baking). A example of a useful combination of various amounts of ingredients for a raw dough composition may include flour in an amount between about 30 percent to about 70 percent by weight of a total dough composition (e.g., from 40 to 60 weight percent flour), water in an amount between about 30 and about 40 percent by weight of the total dough composition, sugar or another sweetener in an amount in a range of between 2 and about 15 percent by weight of the total dough composition, and fat (shortening or oil) in a range of between 0 and 10 percent by weight of the total dough composition. Other ingredients such as dough conditioners, flavorings, and salt may be present, as well as other well known ingredients, additives, preservatives, as will be understood.

A flour can be any suitable flour or combination of flours, including glutenous flour or a combination of glutenous and nonglutenous flours, and combinations thereof. The flour or flours can be whole grain flour, flour with the bran and/or germ removed, or combinations thereof.

A dough composition can also include one or more liquid component such as water, milk, eggs, and oil, or any combination of these. Water may be added during processing in the form of ice, to control the dough temperature in process; the amount of any such water used is included in the amount of liquid components. The amount of liquid components included in any particular dough composition can depend on a variety of factors including the desired moisture content of the dough composition. Typically, liquids can be present in a dough composition in an amount between about 15% by weight and about 35% by weight, e.g., between about 20% by weight and about 30% by weight.

The dough can optionally include an egg product, e.g., for flavoring. Examples of egg products include fresh eggs, egg substitutes, dried egg products, frozen egg products, etc. The amount of egg products, if used, can be between about 0.1 percent by weight and about 35 percent by weight. The egg products may be in a dried form or a liquid form. If a liquid form of egg product is used, the amount of liquid component is adjusted to take into account the moisture content resulting from the liquid egg product.

The dough can optionally include dairy products such as milk, buttermilk, or other milk products, in either dried or liquid forms. Alternatively, milk substitutes such as soy milk may be used. If used, dairy products can be included as up to about 25 percent by weight of the dough composition, e.g., between about 1 percent and about 10 percent of the dough composition. If a dried dairy product is used, it is not considered to be a part of the liquid component identified above; if a liquid form of a dairy product is used, the amount of other liquid components, if any, can be adjusted accordingly.

The dough can optionally include fat ingredients such as oils and shortenings. Examples of suitable oils include soybean oil, corn oil, canola oil, sunflower oil, and other vegetable oils. Examples of suitable shortenings include animal fats and hydrogenated vegetable oils. An amount of fat used can depend in large part on the particular type of dough composition being prepared, i.e., a bread, a bagel, or a donut, roll, or other pastry. Fat can typically be used in amounts less than about 20 percent by weight, often less than 10 percent by weight of a total weight of a dough composition. If liquid oils are used as a fat, the amount of other liquid components can be adjusted accordingly.

The dough can optionally include one or more sweetener, natural or artificial, liquid or dry. If a liquid sweetener is used, the amount of other liquid components can be adjusted accordingly. Examples of suitable dry sweeteners include lactose, sucrose, fructose, dextrose, maltose, corresponding sugar alcohols, and mixtures thereof. Examples of suitable liquid sweeteners include high fructose corn syrup, malt, and hydrolyzed corn syrup. Often, dough compositions include between about 2% by weight and about 15% by weight, e.g., from about 5% by weight to about 10% by weight sweetener.

The dough can further include additional flavorings, for example, salt, such as sodium chloride and/or potassium chloride; whey; malt; yeast extract; inactivated yeast; spices; vanilla; natural and artificial flavors; etc.; as is known in the dough product arts. The additional flavoring can typically be included in an amount in the range from about 0.1 weight percent to about 10 weight percent of the dough composition, e.g., from about 0.2 to about 5 weight percent of the dough composition.

The dough can optionally include particulates such as raisins, currants, fruit pieces, nuts, seeds, vegetable pieces, and the like, in suitable amounts.

As is known, a dough can also optionally include other additives, colorings, and processing aids such as emulsifiers include lecithin, mono- and diglycerides, polyglycerol esters, and the like, e.g., diacetylated tartaric esters of monoglyceride (DATEM) and sodium stearoyl-2-lactylate (SSL).

According to the invention, a yeast-fermented dough composition is further processed to include dry yeast, and the dough composition is then frozen while at least some of the dry yeast remains non-hydrated. Because at least a portion of the dry yeast does not become hydrated, and therefore not activated (prior to freezing), that portion of dry yeast does not become weakened in a way that would make yeast cells more susceptible to damage upon freezing or during frozen storage. This portion of dry yeast, therefore, can be more active after thawing and can exhibit better activity, including better proofing properties when the dough is thawed, for proofing prior to baking.

The portion of dry yeast that does not become hydrated, of the total amount of dry yeast that is added to a dough composition, can be an amount that will result in desired proofing properties following freezing, storage, and thawing. Some of the yeast included in a dry yeast ingredient may become hydrated prior to freezing. The percentage that does become hydrated will depend on various factors such as the amount of time and mixing between adding dry yeast ingredient and placing the dough composition at freezing temperature, the form of the dry yeast, etc. In certain embodiments of the invention, the amount of the total late stage dry yeast that does not become hydrated during pre-freezing processing can be a preponderance of the total amount of late stage dry yeast that is added to the dough composition, e.g., greater than 50 percent of the total amount of late stage dry yeast, e.g., greater than 70 or 80 percent of the total amount of the late-stage dry yeast.

An amount of dry yeast ingredient, e.g., active dry yeast or instant dry yeast, that can be added to a dough composition of the invention as late stage dry yeast, can be an amount that, in combination with the other ingredients and the timing of processing steps, allows at least a portion of the dry yeast to remain non-hydrated when the dough composition is frozen (i.e., when the dough is placed at frozen or sub-freezing temperature), to provide desired proofing properties upon thawing. Exemplary amounts of a typical dry yeast ingredient, including about 7 percent by weight moisture, can be included in a dough composition in the range from 0.5 to 5 percent dry yeast by weight on a total formula basis (total weight of a dough composition), e.g., in the range from 1 to 3 percent by weight dry yeast on a total formula basis.

Dry yeast can be added to a yeast-fermented dough composition by any processing step or steps that will place the dry yeast in the yeast-fermented dough composition for additional processing as desired, and freezing without at least a portion of the dry yeast becoming hydrated. For example, a dry yeast or a dry yeast ingredient can be combined with a dough composition or a dough ingredient by any of a variety of steps or techniques that include mixing, lapping, folding, laminating, or a combination of these. In general, mixing at low speeds and low shear, for a short period of time, to at least distribute dry yeast throughout the dough, if not necessarily to produce a uniform distribution, can be used.

Also a factor in incorporating dry yeast into a yeast-fermented dough without at least a portion of the dry yeast becoming hydrated, can be the particular composition and form of the dry yeast. In certain embodiments, late stage dry yeast can be added in the form of a dry yeast ingredient that includes granules of dry yeast. Such a dry yeast ingredient can be mixed into the dough composition using a mixer at low speed for a short time to cause distribution of the yeast throughout the dough. The timing and mixing speed should be such that at least a portion of the individual yeast cells remain in the form of granules, and do not become distributed throughout the dough composition as individual yeast cells where the cells may become hydrated. In certain even more specific embodiments, dry yeast can be added at a late stage of processing such as after most or all other ingredients have been added to the dough composition, and the dry yeast can be incorporated into the dough by mixing at low speed for a relatively short time period, e.g., for up to 5 minutes, for up to 3 minutes, or for up to 1 minute.

Still referring to the use of dry yeast ingredients that contain granules, at standard processing temperatures, such granules, even if not exposed to mixing to dislocate yeast cells from the granules, may typically become hydrated by absorption of water by the granule within about an hour after exposing the granules to other ingredients of a dough composition that include water. Thus, even if little or no mixing is used to incorporate dry yeast ingredient granules into a dough composition, a dough composition according to the invention that includes granules of dry yeast ingredient can be frozen within a time that allows at least a portion of yeast cells in those granules to remain non-hydrated, e.g., by initiating frozen storage within one hour, or within 30 minutes or 15 minutes, from addition of the dry yeast ingredient.

Following are descriptions of certain specific embodiments of the invention that involve combining dry yeast with yeast-fermented dough compositions prepared by various methods, including a sponge method, a straight dough method, and a re-work method.

According to one embodiment of the invention, a yeast-fermented dough composition can be prepared using a sponge method. In general, a sponge dough composition can be prepared, allowed to ferment, and additional dough ingredients can be added. A dry yeast ingredient can be added to the sponge or to a dough composition prepared from the sponge. For example, a sponge may be prepared by combining ingredients including yeast, water, a portion of a total amount of flour, and a yeast food such as sucrose. These ingredients can be combined (e.g., mixed) and then held to allow the yeast time to ferment and to produce carbon dioxide. A holding period for a sponge may be an amount of time that allows the sponge to ferment to a desired raw specific volume. Exemplary amounts of time that can be useful for allowing a sponge to ferment, e.g., at room temperature, can be in the range from 30 minutes to 12 hours. (This sponge composition may be referred to as a yeast-fermented dough composition.) After fermentation of a sponge, remaining flour, some additional water, and minor dry ingredients can be mixed into the fermented sponge to form a dough composition that can be further processed. According to the invention, dry yeast can be added to the yeast-fermented dough sponge or a dough composition prepared from the yeast-fermented sponge, and the resultant dough composition can be frozen while at least a portion of the yeast of the dry yeast ingredient remains dry and non-hydrated.

Another example of methods useful to produce a yeast-fermented dough composition can be those referred to as straight-dough methods. Steps included in a straight-dough process can include a step of mixing most or all of the flour, minor dry ingredients, water, yeast food, and an early stage yeast portion that can be a high moisture yeast ingredient. The ingredients are mixed and the resultant dough, if desired, can be rested or retarded (e.g., at room temperature or refrigerated conditions) to allow the yeast to ferment. A rest step or retarding step can be for an amount of time that allows desired fermentation and raw specific volume properties, and may depend on the temperature at which the dough is rested or retarded. Upon resting or retarding and consequent fermentation, such a dough composition is referred to as a yeast-fermented dough composition as used herein. Also according to the invention, dry yeast can be added to the yeast-fermented dough composition and the dough composition can be frozen while at least a portion of the yeast of the dry yeast ingredient is non-hydrated.

Other methods can be similarly used to prepare yeast-fermented dough compositions and frozen dough compositions as described herein. Other examples include methods that involve recycling a dough composition following processing to produce a dough piece for packaging or other use. Specifically, a dough composition (before, during, or after becoming fermented) can be processed by cutting to produce dough pieces, wherein portions of dough are cut away as scrap. These cut-away portions or scraps can be referred to as "re-work" dough, and can be combined with other dough compositions or dough ingredients, e.g., for recycling to reduce waste. Such re-work dough may be fermented due to the time taken to process the dough from its ingredients up until cutting, or may be allowed to sit and ferment for an amount of time after being cut and removed from a larger dough portion during processing, to become a yeast-fermented dough composition. A re-work dough composition in the form of a yeast-fermented dough composition can have desired raw specific volume as described herein, and can be combined with other dough or dough ingredients, including dry yeast. According to certain embodiments of the invention, late stage dry yeast can be added to the yeast-fermented dough composition, and the dough can then be frozen while at least a portion of the yeast of the dry yeast ingredient is non-hydrated, e.g., within one hour or within thirty minutes from addition of dry yeast.

Still another process that can be used according to the invention to prepare a yeast-fermented dough composition is a continuous process. As an example, a yeast-fermented dough composition may be prepared by continuously combining and mixing ingredients including a slurry of yeast, water, yeast food, sugar, flour, and optionally other remaining dough ingredients, and allowing the yeast of the slurry to ferment. The yeast-fermented slurry can be combined with any remaining dough ingredients as well as dry yeast according to the present description. Such a yeast-fermented dough composition, following addition of dry yeast, can be frozen while at least a portion of the yeast of the dry yeast ingredient is non-hydrated, e.g., within one hour or within thirty minutes from addition of dry yeast.

Once a dough composition has been prepared by combining late stage dry yeast ingredient with a yeast-fermented dough composition, the resultant dough composition can be further processed according to known methods of forming a dough composition into a desired size and shape, followed by one or more additional steps such as packaging, freezing, thawing, proofing (after thawing), and cooking. A variety of techniques can be used for processing, as are known. For example, processing a dough composition can include one or more of sheeting, extruding, dividing and rounding, and the like; cutting to a desired size and shape; folding; filling (optionally), etc.

A dough composition prepared as described can be assembled into any of a variety of shapes and products, as desired. Methods and equipment for shaping, sizing, or otherwise cutting sheeted dough compositions are well known. The size and shape of the product may depend on the type of dough product being prepared, as well as other factors such as the dough composition, e.g., whether it is light and/or sweet like a donut or heavy like a pretzel or bagel, whether or not it is intended to be heated (e.g., in a toaster), etc.

Dough compositions, e.g., dough pieces, can be frozen (either before or after other steps such as packaging) by exposure to a frozen storage temperature. Freezing a dough composition can be accomplished by known methods, such as by placing the dough composition at a frozen or sub-frozen temperature. The freezing step may be at typical freezing temperatures such as 10 F, 0 F, or −10 F, and may optionally include the use of a blast freezer if desired. For frozen storage or distribution, i.e., a temperature of less than 32 F (0 C), an exemplary storage temperature can be in the range of between about −20 F and about 20 F, e.g., in a range of between about −10 F (−25 C) and about 10 F (−12C). Storage temperature may vary throughout storage time. During frozen storage, some amount of the non-hydrated yeast may become hydrated, but such hydration during frozen storage can occur slowly enough to still achieve frozen stability, shelf lives, and desired proofing properties upon thawing.

According to the invention, a dough composition is not processed to include a proofing step prior to freezing, but can be frozen at a desired raw specific volume, e.g., in the range from 0.9 to 1.3 cubic centimeters per gram (cc/g), or from 1 to 1.2 cc/g.

A dough composition prepared as described can be packaged by any desired methods and using any desired packaging materials. The packaging need not be air tight, but can be closed to prevent water loss. The composition need not be packaged to maintain the dough composition in a modified atmosphere such as an atmosphere that includes an artificially high concentration of one or more of nitrogen or carbon-dioxide compared to ambient atmospheric air, although such modified atmosphere packaging can be used if desired.

The frozen dough composition can be stored, then thawed, proofed, and cooked as desired. For example, a frozen dough composition can be removed from frozen storage and thawed over any desired period of time, at either refrigerated temperature or room temperature. During the thawing process, the yeast cells that are non-hydrated at freezing will become hydrated by liquid water of the thawing or thawed dough composition. These yeast cells become hydrated and active in producing carbon dioxide that contributes to proofing the thawed raw dough composition.

Certain embodiments of the invention can exhibit very good frozen storage stability and proofing properties following frozen storage and thawing. For example, certain dough compositions of the invention can be stored frozen, for example, at a temperature of about 10 F, for up to or exceeding 2 weeks, 4 weeks, 6 weeks, or greater than 10, 20, 30, or 36 weeks. Such dough compositions can be proofed to a raw specific volume that is at least double the raw specific volume of the un-proofed (e.g., frozen) dough composition (e.g., a raw specific volume in the range from 1.8 to 2.6 cc/g), within a practical amount of time. Exemplary proofing times for a frozen dough composition of the invention, once thawed, can be, e.g., less than 120 minutes, e.g., within a time in the range from 15 minutes to 90 minutes following thawing. Exemplary raw specific volumes of a proofed dough composition can be in the range from about 1.5 to about 3 cc/g, often from about 1.8 to about 2.6 cc/g.

Also according to certain embodiments of the invention, a thawed and proofed dough can be cooked (e.g., baked) to exhibit good baked specific volume. Exemplary baked specific volumes (BSVs) of a baked dough composition according to the invention can be in the range from about 2.8 cc/g to 4 cc/g or more, often from about 3 cc/g to about 4 cc/g.

A dough composition can be cooked by conventional methods, such as by oven baking. Exemplary cooking temperatures can be in the range of between about 325 F (163 C) and about 400 F (205 C) for baking and is in the range of between about 350 F (175 C) and about 400 F (205 C) for frying. The dough can be baked in any type of oven, such as conventional, convection, or impingement ovens.

The invention can be applied to a broad range of dough products, ranging from sweet rolls to bread doughs to any other yeast-fermented finished dough products such as breads (pan bread, baguettes, dinner rolls), pizza crust, and sweet rolls, and other dough products.

The above embodiments of methods and compositions according to the present invention are not intended to be exhaustive or to limit the invention to the precise forms disclosed in the following detailed description. Rather, the embodiments are chosen and described so that others skilled in the art may appreciate and understand the principles and practices of the present invention.

EXAMPLES

Figure 2:
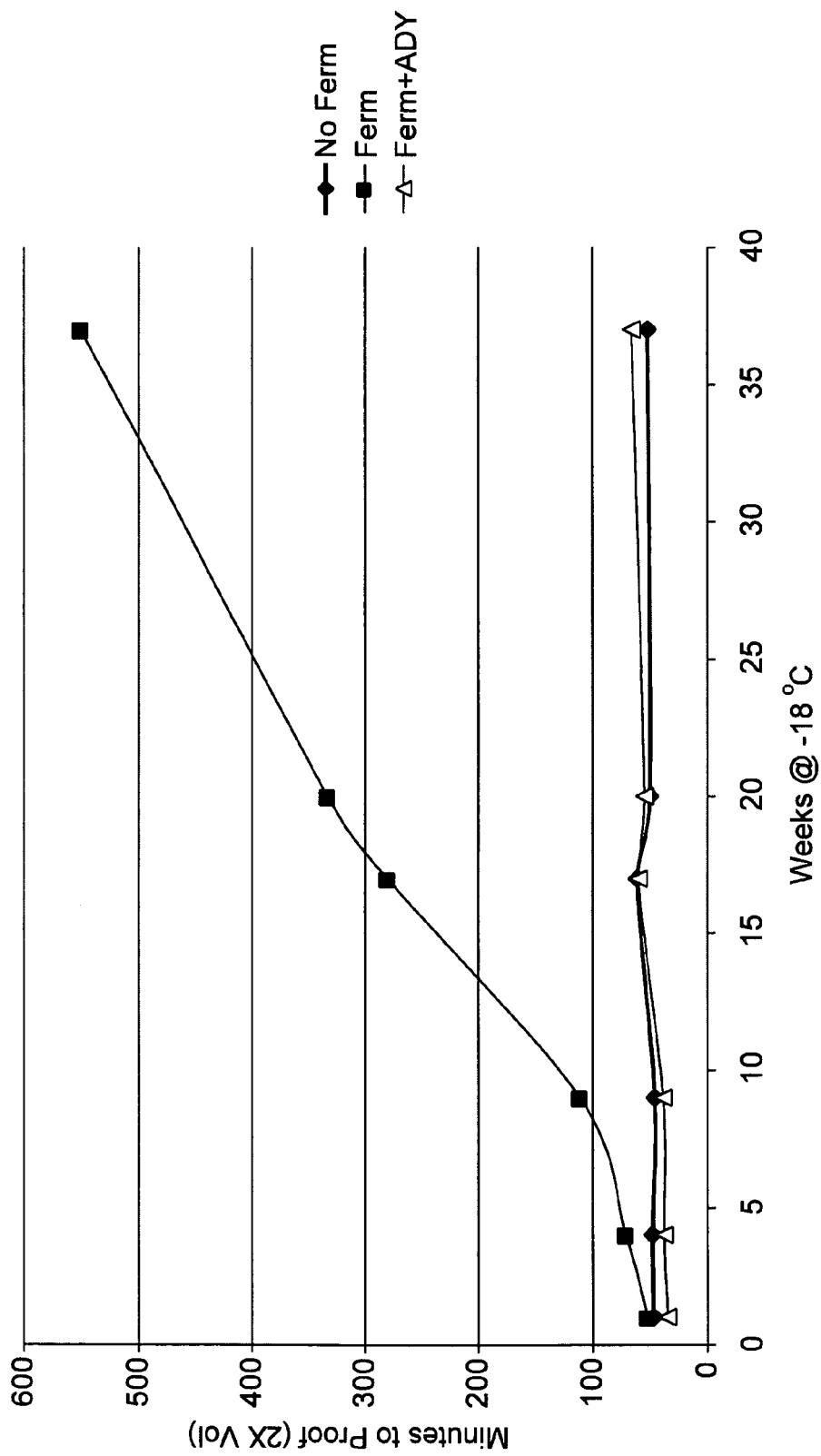
FIG. 2 is a graph of minutes to proof versus weeks at frozen storage of dough compositions.

FIG. 2 compares proofing properties of an exemplary unproofed, frozen, yeast-fermented dough composition of the invention, to proofing properties of a similar dough that is not fermented, and to proofing properties of a fermented dough composition that is not prepared according to the present description.

Proofing properties of a non-fermented frozen dough ("No Ferm") are of a dough that was not allowed to ferment prior to freezing (this dough composition does not contain a substantial amount of fermented yeast, and is not a "yeast-fermented" dough composition). Non-fermented frozen doughs can typically have greater shelf life than yeast-fermented dough compositions (see "Ferm," below), because the non-fermented (and non-hydrated) yeast suffers less damage during freezing and frozen storage compared to hydrated and fermented yeast. The graph at FIG. 2 shows that the shelf life of this frozen dough is acceptable to at least 36 weeks of storage at −18C.

Proofing properties of a yeast-fermented frozen dough ("Ferm") are of a dough that contains yeast that was allowed to ferment prior to freezing (this dough composition contains a substantial amount of fermented yeast, and is a "yeast-fermented" dough composition). As is reflected in FIG. 2, the yeast-fermented frozen dough exhibit a substantially shorter shelf life than the non-fermented dough composition.

Proofing properties of a dough composition of the invention are illustrated with the "Ferm-ADY" sample. This sample includes an amount of yeast added at an early stage of processing, which ferments (by processing in the same manner as the Ferm samples), and additionally includes active dry yeast ("ADY") added at a time during processing that prevents at least some of the dry yeast from becoming hydrated prior to freezing. The graph shows that even though the Ferm-ADY samples were fermented in the same fashion as the Ferm samples, the Ferm-ADY samples exhibit a shelf life that is almost identical to the shelf life of the No Ferm samples. The data of FIG. 2 is the average of three independent experiments all carried out over 37 weeks of storage at −18 degrees Celsius (−18C).

Briefly, the doughs included ingredients as follows:

| Ingredient | % (total formula) |
| --- | --- |
| Dough | |
| Flour | 56.6 |
| Shortening | 2.0 |
| Sucrose | 2.0 |
| Salt | 1.0 |
| Dough Conditioners | 0.4 |
| Preferment | |
| Water | 34.0 |
| Compressed yeast | 2.0 |
| Sucrose | 1.0 |
| Dry Yeast (late stage) | 1.0 |
| Total | 100.0 |

The sponge was prepared and frozen (for the non-fermented sample) and fermented (for 100 minutes for the fermented sample). For the Ferm-ADY sample, ADY was added to fermented dough as a third stage ingredient with low speed mixing (see FIG. 1):

1st stage=blend liquid ferment, remaining water and dry ingredients, (1 min. low speed).
2nd stage=add shortening, mix at low speed for 1 min.
3rd stage=add ADY mix at low speed for 1 min.

The dough samples were cut into 100 gr. samples, packaged in plastic bags and frozen @ −10 F overnight. The samples were stored at 0 F for the remainder of the experiment.

FIG. 2 plots the time taken for a dough to proof (to double its initial volume) as a function of time that the frozen dough is stored at −18 C. The three samples represent the following:

1) The "No Ferm" sample represents how frozen dough is often made. "No Ferm" refers to the fact that the dough is not allowed to ferment prior to freezing. This is often the practice in frozen dough manufacturing, as it maximizes shelf life, which is often limited by a gradual increase in the time that it takes to proof the dough prior to baking.

2) The second sample "Ferm" illustrates that a dough that ferments prior to being frozen can exhibit a reduced shelf life, limited by unacceptably long proof times. The fermentation here was in the form of a sponge that was fermented for 100 minutes at room temperature.

3) The "Ferm+ADY" sample was fermented dough with the addition of Active Dry Yeast (ADY) in the final mix stage, as explained. The fermentation was exactly as in the "Ferm" sample.

Samples were analyzed for their ability to produce gas and proof the dough as follows. Samples were thawed overnight in a plastic container in a 34 F refrigerator. The samples were then analyzed in using a Risograph (30–32 C). Gas collection was ended as soon as 150 cc of gas was produced. The headspace in the Risograph jar was then measured via a rape seed method. This data was used to calculate dough expansion and time to double in volume.

I claim:

1. A method for producing an unproofed frozen dough, the method comprising
   preparing a yeast-containing dough comprising an early stage portion of yeast,
   allowing at least some of yeast of the early stage portion of yeast to ferment to form a yeast-fermented dough composition,
   adding dry yeast to the yeast-fermented dough composition, and
   freezing the yeast-fermented dough composition without proofing and while some of the added dry yeast is non-hydrated.

2. The method of claim 1 comprising
   adding dry yeast ingredient to the dough, the dry yeast ingredient comprising granules of yeast cells,
   mixing the dry yeast ingredient into the yeast-fermented dough composition using a mixing time and a mixing speed that allows granules to remain following mixing, and
   and freezing the dough within 1 hour from mixing in the dry yeast ingredient.

3. The method of claim 1 comprising, after allowing at least some of the yeast of the early stage yeast portion to fermented,
   adding late stage dry yeast ingredient to the yeast-fermented dough composition in an amount to include from 0.5 to 5 weight percent added late stage dry yeast ingredient per total weight frozen dough composition, the dry yeast ingredient comprising granules of yeast cells,
   mixing the dry yeast ingredient into the yeast-fermented dough composition using a mixing time and a mixing speed that allows granules to remain following mixing, and
   freezing the dough composition within 1 hour from addition of the dry yeast ingredient.

4. The method of claim 1 wherein the dry yeast is in the form of a dry yeast ingredient containing less than 10 percent moisture by weight.

5. The method of claim 1 comprising
   thawing the frozen dough, and
   proofing the thawed dough to at least twice a frozen volume, within a time in the range from 15 to 120 minutes.

6. The method of claim 1 comprising
   preparing a yeast-containing dough by combining ingredients comprising
      from 30 to 70 weight percent water,
      from 30 to 70 weight percent flour, and
      from 0.5 to 5 weight percent early stage yeast, based on the total amount of dough, and
   allowing some of the yeast of the early stage yeast to ferment to produce yeast-fermented dough composition,
   adding from 0.5 to 5 weight percent late stage dry yeast ingredient to the yeast-fermented dough composition, based on the total weight of the dough composition.

7. The method of claim 6 comprising freezing the dough composition within 1 hour from addition of the late stage dry yeast ingredient.

8. The method of claim 7 comprising
   storing the frozen dough at frozen conditions for at least two weeks,
   thawing the dough, and
   proofing the dough.

9. The method of claim 7 comprising
   storing the frozen dough at frozen conditions for at least 30 weeks,
   thawing the dough, and
   proofing the dough.

10. A method for producing a frozen, unproofed dough composition, the method comprising
    preparing a yeast-containing dough comprising an early stage portion of yeast,
    allowing at least some of yeast of the early stage portion of yeast to ferment to form a yeast-fermented dough composition,
    adding dry yeast to the yeast-fermented dough composition, and
    freezing the yeast-fermented dough composition without proofing.

11. The method of claim 10 comprising combining by mixing, dough ingredients comprising
    from 30 to 70 weight percent flour,
    from 30 to 70 weight percent water,
    up to 10 weight percent fat, and
    from 0.5 to 5 weight percent high moisture yeast. based on the total weight of the dough composition, to produce a yeast-containing dough composition,
    allowing yeast to ferment to produce a yeast-fermented dough composition,
    adding from 0.5 to 5 weight percent dry yeast ingredient to the yeast-fermented dough composition, based on the weight of the dough composition, the dry yeast ingredient including granules of yeast cells,
    mixing the dry yeast ingredient into the yeast-fermented dough composition using a mixing time and a mixing speed that allows granules to remain following mixing, and
    freezing the dough within one hour after adding the dry yeast ingredient.

12. The method of claim 10 comprising
    preparing a dough sponge comprising
       flour,
       water, and
       from 0.5 to 5 weight percent high moisture yeast ingredient, based on the total weight of the dough composition,
    fermenting the dough sponge to provide a yeast-fermented dough sponge, adding from 0.5 to 5 percent by weight dry yeast ingredient to the fermented dough sponge, based on the total weight of the dough composition, and freezing the dough composition within one hour after adding the dry yeast ingredient.

13. The method of claim 10 comprising combining by mixing, dough ingredients comprising
from 30 to 70 weight percent flour,
from 30 to 70weight percent water, and
from 0.5 to 5 weight percent high moisture yeast ingredient to produce a yeast-containing dough sponge, based on the total weight of the dough composition, allowing the yeast to ferment to produce a yeast-fermented sponge dough composition, adding additional dough ingredients to the yeast-fermented dough sponge including
flour,
up to 10 weight percent shortening, and
from 1 to 3 weight percent dry yeast ingredient. based on the weight of the dough composition, and freezing the fermented dough composition within 1 hour following addition of the dry yeast ingredient.

14. The method of claim 10 comprising preparing a yeast-containing dough composition,
processing the dough to produce re-work dough composition,
allowing the re-work dough to ferment to provide a yeast-fermented dough composition,
adding dry yeast ingredient to the yeast-fermented re-work dough composition, and
freezing the dough composition within one hour of the addition of the dry yeast ingredient.

* * * * *